United States Patent Office 2,710,845
Patented June 14, 1955

2,710,845

CELLULOSE ESTERS STABILIZED WITH A RESINOUS POLYMERIC EPOXIDE AND A METAL SALT

Mortimer S. Thompson, Matawan, N. J., assignor to Hercules Powder Company, Wilmington, Del., a corporation of Delaware No Drawing. Application June 26, 1952,
Serial No. 295,810

10 Claims. (Cl. 260—13)

This invention relates to heat-resistant plastic compositions and to a method for producing same. In a particular aspect this invention relates to cellulose acetate plastic compositions of high thermal stability and to a method for preparing such compositions.

Plastic articles made of cellulose acetate compositions have been made heretofore by molding processes which employ heat and pressure to form the desired product. For example, shaped plastic articles can be made from cellulose acetate compositions in the form of sheets, rods, tubes, and the like, formed by extruding the plastic composition through a hot forming die, and innumerable objects may result from the use of such procedures. Such objects as motor housings, electrically lighted ornaments, household articles, toiletry articles, toys, etc., can be formed by injection molding cellulose acetate compositions into suitable mold cavities at elevated temperatures and pressures. Also, similar articles can be formed by compression molding procedures using elevated temperatures and pressures. In addition, a variety of articles can be formed by slush casting by subjecting highly plasticized compositions to elevated temperatures. The articles that are formed by such procedures are generally made from molding powders containing cellulose acetate flake, and the usefulness of such articles is increased by improving the thermal stability of the cellulose acetate composition.

In some current commercial procedures for producing cellulose acetate, sulfuric acid is employed in the reaction mixture, and consequently the resulting cellulose acetate contains small quantities of sulfuric acid in the form of combined sulfate groups. These sulfate groups are highly heat sensitive, and upon exposure of the cellulose acetate to heat, the sulfate groups are converted to free sulfuric acid which tends to degrade the cellulose acetate. Such degradation of the cellulose acetate chain adversely affects the properties such as color, impact strength, tensile strength, elongation, flexural strength, stiffness, and the like, of the cellulose acetate. Prior art procedures for stabilizing cellulose acetate containing combined sulfate groups depended to a large extent upon the use of neutralizing types of compounds as stabilizers, and among such stabilizers are carbonates, bicarbonates, tartrates, citrates, oxalates, and the like, of various metals such as sodium, calcium, magnesium, lithium, barium, and the like. Successful use of the neutralizing type of stabilizers for the optimum combination of color and strength properties depends upon an almost perfect balance between the amount of a particular stabilizer and the concentration of combined sulfate groups in the cellulose acetate. Because of variables inherent in the cellulose acetate manufacture, the required amount of stabilizer may vary from lot to lot, and the necessary balance of stabilizer and sulfate groups can be achieved only by trial and error. The use of such stabilizers in this manner is therefore not well suited for close control and uniform production in lagre scale manufacturing processes. When such stabilizers are employed, the cellulose acetate in most instances is either under-stabilized or over-stabilized. In the case of under-stabilization, insufficient stabilizer is present to neutralize the sulfate groups resulting in a degradation of the cellulose acetate chain by liberated sulfuric acid, loss of strength properties, and impairment of color. An excessive amount of stabilizer above that required results in over-stabilization which, although not generally harming strength properties, adversely affects the plastic color, and, in the case of some stabilizers, reduces clarity. A cellulose acetate plastic is said to be properly heat stabilized when the stabilizer-sulfate balance is such as to achieve the optimum combination of color and strength properties.

In instances of over-stabilization with neutralizing type stabilizers, a common practice in the trade is to add small amounts of a weak organic acid, such as tartaric acid or citric acid or the like, sometimes referred to as color stabilizers, to reduce the amount of over-stabilization and to more closely approach the required stabilizer-sulfate balance. While this technique is effective in counteracting the harmful color effects of over-stabilization, it is nevertheless subject to the same limitations of control that attend the use of neutralizing type stabilizers.

It is an object of this invention to provide a novel and improved method for thermally stabilizing cellulose acetate compositions.

It is another object of this invention to provide a novel and improved method for stabilizing cellulose acetate compositions wherein close control between the amount of stabilizer and the concentration of combined sulfate groups in the cellulose acetate is unnecessary.

It is a further object of this invention to provide cellulose acetate compositions of improved thermal stability.

Further and additional objects and advantages of this invention will be apparent from the detailed disclosure hereinafter.

In accordance with this invention it has been found that cellulose acetate compositions containing combined sulfate groups can be thermally stabilized by incorporating in the composition an epoxide containing at least one epoxy group or oxirane ring. For optimum stabilization the composition also contains at least one neutralizing type stabilizer. The epoxide and the neutralizing type stabilizers are employed in an amount at least sufficient to react or to combine with all the releasable sulfuric acid. Consequently, the sulfuric acid produced by heating the cellulose acetate composition is rendered ineffective for degrading the composition before any appreciable degradation can occur, and accordingly, the heat resistance or heat stability of the cellulose acetate composition is significantly improved.

The following examples are illustrative and demonstrate the utility of this invention. In all the examples the compositions are shown in parts by weight and the cellulose acetate contains from 55.5% to 56.2% combined acetic acid and a 20% solution has a viscosity range of 35 to 55 seconds in a 90:10 acetone-ethanol solvent. The cellulose acetate was produced in the presence of sulfuric acid, and neutralizing type stabilizers were incorporated in the cellulose acetate by washing the esterification product with a wash water containing the neutralizing type stabilizers.

*Example 1*

The following compositions were extrusion compounded at 400° F. through a conventional cellulose acetate extruder to obtain molding powder:

|  | Run 1 | Run 2 |
|---|---|---|
| Cellulose acetate | 100 | 100 |
| Diethyl phthalate | 35 | 35 |
| Tartaric acid | 0.01 | 0.01 |
| Epon RN-48 |  | 0.5 |

NOTE.—Epon RN-48 is an epoxy-type resin condensation product of epichlorohydrin and bisphenol produced by Shell Chemical Co.

The diethyl phthalate, tartaric acid, and epoxide were mixed together before being added to the cellulose acetate flake prior to extrusion. Two grams of each molding powder were placed in a test tube and exposed to a temperature of 200° C. for one hour. The test tubes were then withdrawn from the heat bath, and after the plastic melts had cooled, 35 ml. acetone were added, and the test tubes agitated until the plastic melts had completely dissolved. The viscosity of each solution was determined at 25° C. in a horizontal capillary viscometer. The product of Run 2 showed a viscosity retention of 57.7% of the original flake viscosity, whereas the product of Run 1 retained only 21.6% of its original viscosity.

Example 2

With the molding powders prepared in Example 1, heat exposure tests at various temperatures for differing intervals were run with the following results:

| Temp., ° C. | Time, Hours | Percent Viscosity Retained | |
|---|---|---|---|
| | | Run 1 | Run 2 |
| 200 | 0.5 | 39.2 | 66.1 |
| | 1.0 | 21.6 | 57.7 |
| | 3.0 | 13.1 | 46.2 |
| 220 | 0.5 | 24.8 | 61.5 |
| | 1.0 | 15.4 | 48.5 |
| | 3.0 | 8.5 | 20.8 |

Example 3

The molding powders of Example 1 were injection molded on a 180-second cycle at 440° F. cylinder temperature in a 4-ounce injection machine to obtain plastic test specimens. The injection-molded specimens were examined for viscosity retention, color retention, impact strength, flexural strength and stiffness. The results of these tests are shown in the following table:

| Plastic Property Tested | Units | Run 1 | Run 2 |
|---|---|---|---|
| Percent Viscosity Retention | Percent | 40.4 | 79.6 |
| Percent Color Retention | do | 95.0 | 95.9 |
| Izod Impact Strength | ft. lb./in. of notch | 2.0 | 3.5 |
| Flexural Strength | p. s. i. | 8,800 | 9,700 |
| Stiffness | p. s. i. | 315,000 | 369,000 |

Plastic properties were determined in accordance with the following ASTM testing methods:

Izod impact _____ D256–47T
Flexural strength _____ D747–48T
Stiffness _____ D747–48T Color stability was determined by comparing the color of the plastics with the color of a sheet compression molded from the molding powder at 350° F. for three minutes. Color stability is expressed in terms of the percentage of the original molding powder color retained, and the color was measured in terms of total light transmission on a spectrophotometer.

Example 4

During the injection molding of the molding powders similar to those described in Runs 1 and 2 of Example 1, the injection cycle was delayed for 15 minutes, the cylinder temperature being maintained at 440° F. After resumption of molding, plastic specimens were molded on a 60-second cycle. Average properties on the first three injected shots after resumption of molding are shown in the following table:

| Plastic Property Tested | Units | Run 1 | Run 2 |
|---|---|---|---|
| Percent Viscosity Retention | Percent | 29.6 | 75.0 |
| Percent Color Retention | do | 91.6 | 94.6 |
| Izod Impact Strength | ft. lb./in. notch | 0.7 | 2.8 |
| Flexural Strength | p. s. i. | 8,600 | 9,100 |
| Stiffness | p. s. i. | 306,000 | 362,000 |

Example 5

The following compositions were compounded on a two-roll mill and the colloided sheets were then ground to obtain molding powders.

| | Run 3 | Run 4 |
|---|---|---|
| Cellulose acetate | 100 | 100 |
| Diethyl phthalate | 45 | 45 |
| Epon RN–34 | | 0.02 |

Note.—Epon RN–34 is an epoxy-type resin condensation product of epichlorohydrin and bisphenol produced by Shell Chemical Co.

The diethyl phthalate and epoxide were mixed together before being added to the flake. The molding powders were tested for heat stability as in Example 1. After seven hours' exposure at 200° C., the product of Run 4 showed a retention of 40% of the original viscosity, whereas the product of Run 3 retained only 26%.

Example 6

To 100 parts of dried pulverized cellulose acetate flake was added 0.26 part of Epon RN–34 in an aqueous emulsion. After thorough mixing, 45 parts of diethyl phthalate was added, and the composition was compounded into molding powder on a two-roll mill. Water introduced in the stabilizer emulsion was vaporized during milling. A portion of the molding powder was then tested for heat resistance according to the method of Example 1 except that the exposure time covered a range of from 1 to 7 hours at 200° C. After these exposures, the per cent viscosity retention of the stabilized sample as compared to a similar unstabilized sample is shown in the following table:

| Exposure Time at 200° C. | Viscosity Retention | |
|---|---|---|
| | Stabilized | Unstabilized |
| 1 hour | 69 | 43 |
| 3 hours | 62 | 30 |
| 7 hours | 54 | 18 |

Example 7

One hundred parts of cellulose acetate flake was slurried in approximately 1000 parts of water. To this slurry was added in an aqueous emulsion 0.013 part of Epon RN–34. The flake was then dried and mixed with 45 parts of diethyl phthalate. This composition was converted to molding powder by milling on a two-roll mill. A portion of this molding powder was tested as in Example 1 except that the exposure time was extended to 3 hours at 200° C. At the end of this exposure the plastic melt had retained 90% of the original viscosity as compared to 56% for an unstabilized composition similarly tested.

Example 8

In order to establish the importance of the neutralizing type stabilizer in the cellulose acetate composition, a sample of cellulose acetate was removed from the manufacturing cycle after precipitation before final washing. The removed sample was then washed with water substantially free of neutralizing type stabilizers and dried. The following composition was then prepared:

Cellulose acetate _____ 100
Diethyl phthalate _____ 43
Epon RN–34 _____ 0.1

The composition was subjected to a 200° C. heat test as described in Example 1 for periods of one and three hours. It was found that after one hour the composition had a 5% viscosity retention and after three hours it had less than 1% viscosity retention.

Example 9

A cellulose acetate composition similar to that of Example 8 but containing 1.0 part of Epon RN-34 per 100 parts of cellulose acetate was tested as described above. This composition after one hour had a 36% viscosity retention and after three hours it had a 6.7% viscosity retention.

The above results indicate that epoxides have a definite stabilization action in cellulose acetate compositions. Experience has revealed that a cellulose acetate molding powder which upon heating at 200° C. retains 50% of the original flake viscosity after one hour and 30% after three hours is sufficiently heat stable to meet the stability requirements of commercial molding and fabrication. To obtain such viscosity retentions, epoxides, when employed without neutralizing type stabilizers, must be used in uneconomically large concentrations. However, good viscosity retention can be obtained when the composition contains an epoxide stabilizer and a neutralizing type stabilizer although both stabilizers are employed in comparatively small amounts.

Example 10

To 100 parts cellulose acetate were added 45 parts of diethyl phthalate containing 0.5 part Epon RN-34 and 0.02 part tartaric acid. A second composition was similarly formulated but with the Epon RN-34 omitted. Both compositions were compounded on a two-roll mill at 330° F. for 10 minutes and the resulting stock pelletized to obtain molding powder. Each molding powder was tested for heat stability according to the method of Example 1. After one-hour and seven-hour exposures, the samples showed the following viscosity retentions:

| Exposure Time | Sample With Epon RN-34 | Sample Without Epon RN-34 |
|---|---|---|
| | Percent | Percent |
| 1 | 40.0 | 24.6 |
| 7 | 30.8 | 11.5 |

This sample demonstrates the stabilizing effect of the epoxides in increased concentration on a hot milled plastic containing tartaric acid.

Example 11

The following compositions were extrusion-compounded into molding powder through a devolatilizing extruder:

| | 1 | 2 | 3 | 4 |
|---|---|---|---|---|
| Cellulose acetate | 100 | 100 | 100 | 100 |
| Diethyl phthalate | 30 | 30 | 30 | 30 |
| Tartaric acid | | | | 0.02 |
| Epon RN-34 | | 0.1 | 0.3 | 0.3 |

The resulting molding powders were subjected to 200° C. heat tests for one and three hours with the following viscosity retentions resulting:

| Exposure Time | 1 | 2 | 3 | 4 |
|---|---|---|---|---|
| 1 hour | 21 | 73 | 93 | 59 |
| 3 hours | 8.9 | 49 | 73 | 40 |

This example demonstrates the stabilizing effect of the epoxides on cellulose acetate plastics of H4 flow both with and without tartaric acid. Comparison of Runs 1, 2, and 3 of the example shows the stabilizing effect of increased epoxide concentrations as compared to an unstabilized portion. Comparison of Runs 3 and 4 of the example shows the effect of tartaric acid on the stabilizing capacity of the epoxides.

In general, any nonvolatile epoxy-type compound compatible with the plastic composition can be employed to stabilize the cellulose acetate composition. The epoxy-type compound is high boiling and of only low volatility at the compounding or molding temperature of the plastic composition. Actually, the epoxy-type compound has a boiling point substantially above the temperature employed in compounding or molding the plastic composition. The epoxy-type compounds for this invention contain at least one epoxy group or oxirane ring and, preferably, no other atoms than carbon, hydrogen, and oxygen. Epoxy-type compounds that can be used are epoxidized oils, for example, peanut oil, corn oil, cottonseed oil, soybean oil, and the like. Epiphenylin can be used, but it is preferred not to use this latter compound because of its toxic nature. Organic polyglycidyl compounds prepared by the polymerization or condensation of glycidol can also be used.

To be effective in most molding operations the epoxy-type compound should have a boiling point in excess of about 350° F. which is a common minimum molding temperature. Preferably, the epoxy-type compound should have a boiling point in excess of 400° F. It will be apparent that epoxy-type compounds have a lower boiling point can be used, but such compounds are not preferred for effecting the desired heat stabilization.

The preferred epoxides that are employed in practicing this invention are reaction or condensation products of an epihalohydrin with a polyhydric phenol. Typical epihalohydrins are epibromohydrin, epiiodohydrin and epichlorohydrin with the latter being preferred. Among the polyhydric phenols that can be used to prepare the resinous polymers are hydroquinone, resorcinol and preferably bisphenol. Generally, the polyhydric phenol is free from functional groups other than the phenolic hydroxyl groups. In preparing the preferred polymer, epichlorohydrin and bisphenol are reacted in the presence of a strong aqueous alkali such as sodium hydroxide. Although equimolar portions of epichlorohydrin and bisphenol can be used, usually one mole of epichlorohydrin is employed for each hydroxyl group of the bisphenol. The epichlorohydrin, bisphenol and caustic alkali can be added to the reaction mixture separately, or the alkali can be mixed with either the bisphenol or epichlorohydrin prior to addition to the reaction mixture. The reaction takes place at a temperature of about 80°–110° C., and it is permitted to proceed for a period of about ½–3 hours or more. At the conclusion of the reaction, the resinous polymeric material is recovered from the reaction mixture in any suitable manner. To be effective in this invention, the resulting polymer must contain at least one epoxy grouping.

The cellulose acetate that is stabilized in accordance with this invention can be prepared by the known procedures for acetylating cellulose in the presence of sulfuric acid. The cellulose acetate that can be used generally has a substitution equivalent between 50% and 62.5% combined acetic acid and a viscosity less than 600 seconds. Cellulose acetates having a substitution equivalent between 52% and 57% combined acetic acid and a viscosity not over 100 seconds are preferred.

The viscosity values described above are determined by measuring the time of fall in seconds of a 5/16-inch steel ball through 10 inches of a 20% solution (by weight) of cellulose acetate dissolved in a solvent composed of 90:10 acetone:ethanol (by weight) at 25° C.

The per cent viscosity retentions referred to in the examples were calculated from viscosities determined on a solution of the flake or plastic in acetone adjusted to contain 5% cellulose acetate by weight and were run in a horizontal capillary viscometer at 25° C.

The neutralizing type stabilizers are compounds that react with and thus neutralize sulfuric acid. Among these stabilizers are the carbonates, bicarbonates, tartrates, citrates, oxalates, and the like, of such metals as sodium, potassium, calcium, magnesium, lithium, barium, and the like. These stabilizers can be added to the cellulose acetate at any time subsequent to the formation of the acetate and prior to its exposure to an elevated temperature. A desirable and preferred method of adding a neutralizing type stabilizer is carried out by incorporating the stabilizer in the wash water that is employed to wash the cellulose acetate. The cellulose acetate, after drying, will then contain sufficient neutralizing stabilizers to produce the desired stabilization.

The amount of neutralizing type stabilizer that is used depends upon such variables as the type of stabilizer employed, the amount of combined sulfuric acid in the cellulose acetate, the amount of stabilization desired, and the like. Since these stabilizers are usually metal salts, as indicated above, the concentration of the neutralizing stabilizers in the cellulose acetate can be expressed by the metallic ion content or analysis of the stabilized composition. The stabilized cellulose acetate compositions contain from 40 to 250 p. p. m. metallic ions. Since the sodium, calcium and magnesium salts are the preferred stabilizers, the metallic ion content of the stabilized composition is mainly made up of sodium, calcium and magnesium ions. Other metallic ions, such as copper, iron, potassium, lithium, barium, and the like, are sometimes present but usually in minor amounts. It has been found that effectively stabilized cellulose acetate compositions can contain from 5 to 80 p. p. m. of sodium ions, from 25 to 60 p. p. m. of calcium ions, and from 10 to 110 p. p. m. of magnesium ions.

The epoxide can be added to the cellulose acetate at any time subsequent to its formation and prior to its exposure to heat. Thus, for example, the epoxide can be added to the cellulose flake after it has been recovered from the acetylating reaction mixture. In one method of adding the epoxide to the cellulose acetate an aqueous emulsion of the epoxide is sprayed onto dewatered flake before the flake is finally dried for packaging and shipping. Alternatively, an aqueous emulsion of the epoxide can be added to a slurry of the flake in water such as in one of the treating tubs employed in the manufacturing procedure wherein the cellulose acetate is washed and purified. In such a procedure the cellulose acetate flake selectively absorbs the epoxide, and the flake is then recovered and dried for packaging. Cellulose acetate flake stabilized by either of these methods is quite suitable for the production of molding powders of high heat stability.

If a molding powder containing plasticizer, coloring pigment, and the like, is to be prepared with the cellulose acetate, such as by an extrusion molding procedure, the epoxide can be added to the cellulose acetate in admixture with the plasticizer. Among the suitable plasticizers that can be used with cellulose acetate are triacetin, camphor, triethylene glycol diacetate, diallyl phthalate, dimethoxyethyl phthalate, triethyl citrate, phenyl salicylate, dimethyl phthalate, diethyl phthalate, triethyl phosphate, triphenyl phosphate, and the like. The plasticizer that is employed depends upon the ultimate properties desired in the cellulose acetate composition and the use to which the composition is to be put.

It has been found that the epoxides described above are effective stabilizers for cellulose acetate when a molding powder of the acetate is prepared by extrusion compounding procedures in the absence of color stabilizers such as tartaric acid. When tartaric acid is incorporated in the composition, the effectiveness of the epoxide is slightly reduced. When the epoxides are used to stabilize cellulose acetate molding powders prepared by hot milling procedures, the effectiveness of the epoxides is also reduced, particularly in the presence of a color stabilizer such as tartaric acid, by the oxidative effect of the air in contact with the stock being milled.

In the preparation of a hot milled cellulose acetate molding powder containing no tartaric acid or other color stabilizer, as little as 0.02 part by weight of epoxide per 100 parts of cellulose acetate produces a marked improvement in heat stability. When tartaric acid or other similar color stabilizer is incorporated in the hot milled molding powder, about 0.2 part epoxide per 100 parts of cellulose acetate flake is needed to obtain a significant improvement in heat stability. When no tartaric acid or other similar color stabilizer is present in the hot milled molding powder, very little further improvement is obtained by increasing the amount of epoxide higher than 0.02 part per 100 parts of cellulose acetate flake. However, when tartaric acid or other similar color stabilizer is present in the hot milled molding powder, increasing the concentration of epoxide above 0.2 part per 100 parts of cellulose acetate produces a gradual improvement in heat stability.

The lower effective concentration limit for extruded molding powders of cellulose acetate without tartaric acid or other similar stabilizer is about 0.01 part per 100 parts of cellulose acetate, and when tartaric acid or other color stabilizer is present in an extruded molding powder, about 0.1 part of epoxide per 100 parts of cellulose acetate is required for effective heat stabilization. In actual practice, the minimum effective concentration of epoxide that is required for adequate heat stabilization is dependent upon variables such as the combined sulfate content of the cellulose acetate, the method of producing the cellulose acetate, and the like. In most instances, about 0.5 part epoxide per 100 parts of cellulose acetate is effective under most normal compounding and injection conditions. Since the epoxides do not exert a detrimental effect upon the cellulose acetate, the epoxides can be used in concentrations greater than that theoretically required and still produce a desirable and suitable commercial product.

The use of the epoxy-type compounds and the neutralizing stabilizers prevents excessive degradation of the cellulose acetate chain upon exposure of the acetate to elevated temperatures. Since the properties of the cellulose acetate, such as color, impact strength, tensile strength, elongation, flexural strength, stiffness, and the like, are generally adversely affected by degradation of the chain, the use of the stabilizers produces plastic compositions which can be subjected to severe heat treatments without seriously impairing these properties.

By practicing this invention, a high degree of uniformity in the heat stability of a cellulose acetate can be achieved in commercial operations. This improvement in the heat stability of the cellulose acetate makes compounding and molding operations less critical with respect to heat stability, and it permits reuse of cellulose acetate scrap material with greatly reduced danger of degradation. Also, this invention provides a means for retaining desirable properties in articles produced from cellulose acetate even when the article is molded under drastic conditions. At the present time, the heat stability of cellulose acetate produced by commercial procedures varies from lot to lot. The result is that many lots of cellulose acetate cannot withstand prolonged or repeated heat exposure without serious degredation. This situation often makes molding operations difficult and reworking of scrap material impracticable. This invention overcomes these defects and difficulties.

Another improvement of this invention is that it is particularly well adapted to commercial control in a plant. Since no delicate balance is required between the combined sulfates in the cellulose acetate and the stabilizers, it is only essential that an adequate quantity of stabilizers be used to tie up the sulfuric acid.

The foregoing discussion has been directed to the improvement of cellulose acetate compositions, and in its preferred form the invention is practiced to improve such compositions. However, the stabilizers described above can also be used to produce heat-resistant plastic compositions containing organic cellulose esters other than cellulose acetate. For example, compositions containing an aliphatic cellulose ester, such as cellulose propionate, cellulose acetate butyrate, celluose acetate sorbate, and the like, can be used in the practice of this invention. The following example demonstrates the manner in which the thermal stability of cellulose acetate sorbate can be improved.

*Example 12*

To 100 parts of cellulose acetate sorbate of 54.9% combined acetic acid and 0.06% sorboyl was added a mixture of 23 parts of diethyl phthalate, 1 part of hydroquinone, and 5 parts of Epon RN–34. A similar sample was also prepared but with the Epon RN–34 omitted. Both samples were extruded through a conventional extruder at 405°–410° F. to obtain molding powders. Plastic disks compression molded at 392° F. for five minutes were prepared from each sample. The unstabilized sample produced an extremely brittle disk which showed evidence of degradation. The disk from the stabilized portion was tough and showed no signs of degradation.

From the above disclosure other advantages and modifications within the scope and spirit of the invention will be apparent to those skilled in the art.

This application is a continuation-in-part of copending application, Serial No. 249,799, filed October 4, 1951.

What I claim and desire to protect by Letters Patent is:

1. The method of preparing an aliphatic cellulose ester-containing composition of high heat stability, said cellulose ester containing combined sulfate groups, which comprises stabilizing said composition with a resinous, polymeric epoxide resulting from the condensation of an epihalohydrin and a polyhydric phenol in an amount within the range of 0.01 to 0.5 part by weight per 100 parts of cellulose ester and with a metal salt selected from the group consisting of alkali metal and alkaline earth metal carbonates, bicarbonates, tartrates, citrates and oxalates in an amount sufficient to provide the stabilized composition with from 40 to 250 p. p. m. of said metals.

2. The method of preparing a cellulose acetate sorbate-containing composition of high heat stability, said cellulose acetate sorbate containing combined sulfate groups, which comprises stabilizing said composition with a resinous, polymeric epoxide resulting from the condensation of an epihalohydrin and a polyhydric phenol in an amount within the range of 0.01 to 0.5 part by weight per 100 parts of cellulose acetate sorbate and with a metal salt selected from the group consisting of alkali metal and alkaline earth metal carbonates, bicarbonates, tartrates, citrates and oxalates in an amount sufficient to provide the stabilized composition with from 40 to 250 p. p. m. of said metals.

3. The method of preparing a cellulose acetate-containing composition of high heat stability, said cellulose acetate containing combined sulfate groups, which comprises stabilizing said composition with a resinous, polymeric epoxide resulting from the condensation of an epihalohydrin and a polyhydric phenol in an amount within the range of 0.01 to 0.5 part by weight per 100 parts of cellulose acetate and with a metal salt selected from the group consisting of alkali metal and alkaline earth metal carbonates, bicarbonates, tartrates, citrates and oxalates in an amount sufficient to provide the stabilized composition with from 40 to 250 p. p. m. of said metals.

4. The method of preparing a cellulose acetate-containing composition of high heat stability, said cellulose acetate having been prepared in the presence of sulfuric acid, which comprises stabilizing said composition with a resinous polymeric epoxide resulting from the condensation of epichlorohydrin and bisphenol in an amount within the range of 0.01 to 0.5 part by weight per 100 parts of cellulose acetate and with an alkali metal carbonate in an amount sufficient to provide the stabilized composition with from 40 to 250 p. p. m. of said alkali metal.

5. As a composition of matter, an aliphatic cellulose ester-containing composition of high heat stability, said cellulose ester containing combined sulfate groups and said composition having been stabilized with a resinous polymeric epoxide resulting from the condensation of an epihalohydrin and a polyhydric phenol in an amount within the range of 0.01 to 0.5 part by weight per 100 parts of cellulose ester and with a metal salt selected from the group consisting of alkali metal and alkaline earth metal carbonates, bicarbonates, tartrates, citrates and oxalates in an amount sufficient to provide the composition with from 40 to 250 p. p. m. of said metals.

6. As a composition of matter, a cellulose acetate sorbate-containing composition of high heat stability, said cellulose acetate sorbate containing combined sulfate groups and said composition having been stabilized with a resinous polymeric epoxide resulting from the condensation of an epihalohydrin and a polyhydric phenol in an amount within the range of 0.01 to 0.5 part by weight per 100 parts of cellulose acetate sorbate and with a metal salt selected from the group consisting of alkali metal and alkaline earth metal carbonates, bicarbonates, tartrates, citrates and oxalates in an amount sufficient to provide the composition with from 40 to 250 p. p. m. of said metals.

7. As a composition of matter, a cellulose acetate-containing composition of high heat stability, said cellulose acetate containing combined sulfate groups and said composition having been stabilized with a resinous polymeric epoxide resulting from the condensation of an epihalohydrin and a polyhydric phenol in an amount within the range of 0.01 to 0.5 part by weight per 100 parts of cellulose acetate and with a metal salt selected from the group consisting of alkali metal and alkaline earth metal carbonates, bicarbonates, tartrates, citrates and oxalates in an amount sufficient to provide the composition with from 40 to 250 p. p. m. of said metals.

8. As a composition of matter, a cellulose acetate molding composition containing combined sulfate groups and having been stabilized with from 0.01 to 0.5 part by weight per 100 parts of cellulose acetate of a resinous polymeric epoxide resulting from the condensation of epichlorohydrin and bisphenol and with an alkali metal carbonate in an amount sufficient to provide the composition with from 40 to 250 p. p. m. of said alkali metal.

9. The method of preparing an aliphatic cellulose ester-containing composition of high heat stability, said cellulose ester containing combined sulfate groups, which comprises stabilizing said composition with a resinous, polymeric epoxide resulting from the condensation of an epihalohydrin and a polyhydric phenol in an amount within the range of 0.01 to 0.5 part by weight per 100 parts of cellulose ester and with a metal salt selected from the group consisting of alkali metal and alkaline earth metal carbonates, bicarbonates, tartrates, citrates and oxalates in an amount sufficient to provide the stabilized composition with an amount of said metal not exceeding 250 p. p. m., said epoxide and metal salt being sufficient to react with all the acids formed by said combined sulfate groups.

10. As a composition of matter, an aliphatic cellulose ester-containing composition of high heat stability, said cellulose ester containing combined sulfate groups and said composition having been stabilized with a resinous polymeric epoxide resulting from the condensation of an epihalohydrin and a polyhydric phenol in an amount within the range of 0.01 to 0.5 part by weight per 100 parts of cellulose ester and with a metal salt selected from the group consisting of alkali metal and alkaline earth metal carbonates, bicarbonates, tartrates, citrates and oxalates in an amount sufficient to provide the composition with an amount of said metal not exceeding 250 p. p. m., said epoxide and metal salt being sufficient to react with all the acids formed by said combined sulfate groups.

References Cited in the file of this patent

UNITED STATES PATENTS

| | | |
|---|---|---|
| 2,267,842 | Schlack | Dec. 30, 1941 |
| 2,382,938 | Gresham | Aug. 14, 1945 |
| 2,394,910 | Gresham | Feb. 12, 1946 |
| 2,450,234 | Evans et al. | Sept. 28, 1948 |
| 2,670,302 | Malm | Feb. 23, 1954 |

FOREIGN PATENTS

| | | |
|---|---|---|
| 506,999 | Great Britain | June 5, 1939 |